United States Patent Office 3,060,121
Patented Oct. 23, 1962

3,060,121
ANTIOXIDANTS
Harold D. Orloff, Oak Park, Gordon G. Knapp, Royal Oak, and Calvin J. Worrel, Detroit, Mich., assignors to Ethyl Corporation, New York, N.Y., a corporation of Delaware
No Drawing. Filed Apr. 4, 1960, Ser. No. 19,509
20 Claims. (Cl. 252—48.2)

This invention relates to novel chemical compounds and to compositions of matter containing these compounds as antioxidants.

It has been discovered that a heretofore unknown class of phenolic compounds possesses outstanding antioxidant properties in a wide variety of organic materials which are subject to oxidative decomposition in the presence of air, oxygen or ozone.

It is an object of this invention to provide a novel class of phenolic compounds possessing outstanding antioxidant characteristics. Another object is to provide novel compositions of matter containing a specific type of phenolic compound as an oxidation inhibitor. A further object is to provide a novel class of phenolic sulfur compounds which have outstanding antioxidant properties when used in small amounts in hydrocarbon fuel and lubricant compositions, rubber and certain synthetic hydrocarbon polymers. A still further object is to provide as new compositions of matter, synthetic hydrocarbon polymers which are stabilized by the phenolic sulfur compounds herein disclosed. A specific object of this invention is to provide polyethylene which possesses outstanding oxidative stability.

The objects of this invention are accomplished by a compound having the formula:

(I)

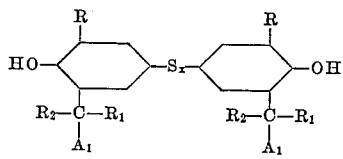

where R is an organic hydrocarbon radical having from 1 to about 22 carbon atoms, $R_1$ is an alkyl radical having from 1 to 3 carbon atoms, $R_2$ is selected from the group consisting of hydrogen and alkyl radicals having from 1 to 3 carbon atoms, $A_1$ is an aromatic hydrocarbon radical having from 6 to about 12 carbon atoms, and $x$ ranges from 1 to 3. These compounds are solids or glassy liquids depending on their state of purity, the nature of the substituent groups and the symmetry (or lack thereof) of the compound. Because of the presence of a plurality of benzene rings, these compounds are ideally suited for use as stabilizers and antioxidants for certain synthetic rubbers and, in addition, are excellent antioxidants for any organic material tending to undergo oxidative deterioration.

Examples of the compounds of this invention include 4,4'-thiobis[2-tert-octyl-6-($\alpha$-ethyl-$\alpha$-methylbenzyl)phenol],
4,4'-dithiobis[2-sec-eicosyl-6-($\alpha$-methylbenzyl)phenol],
4,4'-thiobis[2-($\alpha,\alpha$-diisopropyl-p-nonylbenzyl)-6-($\alpha,\alpha$-diisopropyl-p-ethylphenylbenzyl)phenol],
4,4'-trithiobis[2-tert-amyl-6-($\alpha,\alpha$-dimethylbenzyl)phenol],
4,4'-thiobis[2-methyl-6-($\alpha$-ethylbenzyl)phenol],
4,4'-dithiobis[2-ethyl-6-($\alpha$-diethyl-3-isobutylbenzyl)phenol],
4,4'-thiobis[2-tert-butyl-6-($\alpha$-propyl-4-phenylbenzyl)phenol],
4,4'-thiobis[2-isopropyl-6-($\alpha,\alpha$-dipropyl-3-hexylbenzyl)phenol],
4,4'-trithiobis[2-hexyl-6-($\alpha$-ethyl-$\alpha$-methylbenzyl)phenol], and
4,4'-dithiobis[2,6-di-($\alpha,\alpha$-diethyl-4-methylbenzyl)phenol].

A preferred embodiment of this invention is a compound having the formula:

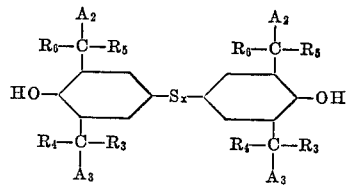

where $R_3$ and $R_5$ are alkyl radicals having from 1 to 3 carbon atoms, $R_4$ and $R_6$ are selected from the class consisting of hydrogen and the methyl group, and $A_2$ and $A_3$ represent aromatic hydrocarbon radicals having from 6 to about 12 carbon atoms. These are preferred because of their antioxidant effectiveness in certain applications. Among the compounds represented by this preferred embodiment are 4,4'-thiobis[2,6-di-($\alpha,\alpha$-dimethylbenzyl)phenol],
4,4'-thiobis[2,6-di-($\alpha$-ethyl-2-isopropylbenzyl)phenol],
4,4'-thiobis[2,6-di-($\alpha$-methylbenzyl)phenol], and
4,4'-thiobis[2-($\alpha$-methylbenzyl)-6-($\alpha,\alpha$-dimethylbenzyl)-phenol].

A particularly preferred embodiment of this invention consists of compounds of the above formula where $R_3$ and $R_5$ are methyl groups. Thus, 4,4'-thiobis[2,6-di($\alpha$-methylbenzyl)phenol],
4,4'-dithiobis[2,6-di-($\alpha,\alpha$-dimethylbenzyl)phenol], and
4,4'-thiobis[2-($\alpha$-methylbenzyl)-6-($\alpha,\alpha$-dimethylbenzyl)-phenol]

represent particularly preferred compounds of this invention. These compounds are preferred because of their unusual antioxidant activity and the fact that they are easily prepared from readily available starting materials.

Another embodiment of this invention consists of those compounds in which R, in the formula first appearing above, is an alkyl group having from 1 to 4 carbon atoms, $R_1$ is hydrogen or a methyl group and $R_2$ is a methyl group. The particularly preferred alkyl groups represented by R are the methyl group, the isopropyl group and the tertiary butyl group. Examples of these preferred compounds are 4,4'-dithiobis[6-($\alpha$-methylbenzyl)-o-cresol],
4,4'-thiobis[2-($\alpha,\alpha$-dimethylbenzyl)-6-tert-butylphenol],
4,4'-trithiobis[6-($\alpha,\alpha$-4-trimethylbenzyl)-o-cresol],
4,4'-thiobis[2-($\alpha$-methyl-m-xylyl)-6-tert-butylphenol],
4,4'-thiobis[6-($\alpha,\alpha$-3,4,5-pentamethylbenzyl)-o-cresol],
4,4'-thiobis[2-isopropyl-6-($\alpha$-methyl-2-ethylbenzyl)phenol],
4,4'-thiobis[6-($\alpha,\alpha$-dimethylbenzyl)-o-cresol], and
4,4'-thiobis[2-($\alpha,\alpha$-dimethylbenzyl)-6-tert-butylphenol].

The compounds of this invention may be prepared by several processes. One of these consists of reacting the parent phenolic compound [for example, 2-methyl-6-($\alpha$-methylbenzyl)phenol] with a sulfur chloride. Either sulfur monochloride, $S_2Cl_2$, or sulfur dichloride, $SCl_2$, may be used. In general the products of these reactions are the thiobis-phenols of this invention having one or more sulfur atoms between the two phenolic rings. However, the polythiophenols of this invention are also produced by the reaction of a sulfur chloride with the parent phenol.

In general, this reaction is conducted in the presence of solvents. Applicable solvents include low boiling hydrocarbons, halogenated hydrocarbons and inert aromatic compounds such as nitrobenzene. Examples of suitable solvent include carbon tetrachloride, chloroform, n-hexene, 2,4-dibromo pentane, low boiling petroleum ether and the like.

Under some conditions the sulfur halide reacts with the starting phenol to form not only the 4,4'-thiobis-substituted phenol but a minor quantity of a halogenated product which can be represented by the formula

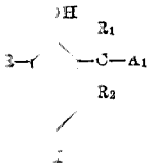

where X represents a halogen, particularly chlorine when a sulfur chloride is used as the conditioning agent.

The thiobis phenols may be separated from the reaction mixture containing the halogen product and used as pure materials. However, it has also been found that the reaction product of a phenol having the formula

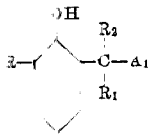

and a sulfur halide is an excellent antioxidant additive to many materials and may be used without removing the halogenated product.

The 2,6-di-substituted phenols used as starting materials in the process of this invention may be prepared by reacting a phenol having a hydrogen atom on a carbon atom ortho to the hydroxyl group with an olefinic compound having an aromatic hydrocarbon radical bonded to one of the unsaturated carbon atoms, in the presence of an aluminum phenoxide catalyst. For example, 6-(o-methylbenzyl)-o-cresol is conveniently prepared by reacting o-cresol with styrene in the presence of a small amount of aluminum o-cresoxide. This process is more fully described in application Serial No. 751,847, filed July 30, 1958, and still further in application Serial No. 801,998 filed March 26, 1959, by Alfred J. Kolka and George G. Ecke, entitled Compositions of Matter.

A modification of the process of condensing the parent phenol with a sulfur chloride involves the use of magnesium as a catalyst. In this process magnesium is added to the reaction mixture and has the advantage of improving the yield of the desired sulfur bridged compound.

Still another process for preparing the compounds of this invention involves the alkylation of 4,4'-thiobisphenol by the use of a suitable olefin and a catalyst. Amongst the catalysts applicable to the process are sulfuric and phosphoric acid and the aluminum phenolate of 4,4'-thiobisphenol. This process is most applicable to the compounds of this invention in which all of the substituents ortho to the phenolic hydroxyl groups are $\alpha$-aryl alkyl groups.

The following examples illustrate the preparation of the products of this invention.

EXAMPLE 1

A reaction vessel equipped with heating means, reflux condenser and means for charging gaseous and liquid reactants was flushed with nitrogen and charged with 60.4 parts of 2,6-bis($\alpha$-methylbenzyl)phenol dissolved in 132 parts of hexane. Sulfur dichloride 11.3 parts dissolved in 66 parts of hexane was added to the phenolic solution with stirring over a 3½ hour period. The mixture was then heated slowly to reflux, reflux being obtained in 2½ hours. The mixture was then cooled and water washed several times with dilute caustic followed by a dilute acid wash. The solvent (hexane) and reactant [2,6-bis($\alpha$-methylbenzyl)phenol] were then removed by vacuum distillation leaving a good yield of 4,4'-thiobis[2,6-di-($\alpha$-methylbenzyl)phenol] as a glassy solid.

EXAMPLE 2

Using the reaction equipment of Example 1, 6-($\alpha$-methylbenzyl)-o-cresol was reacted with sulfur dichloride. The reaction equipment was first flushed with nitrogen and was then charged with 42.4 parts of 6-($\alpha$-methylbenzyl)-o-cresol dissolved in 132 parts of hexane. The sulfur dichloride, 11.3 parts dissolved in 66 parts of hexane was added over a 5 hour period at room temperature. A 30 minute induction period was observed after which time an efflux of hydrogen chloride gas was observed and the reaction proceeded until all the sulfur dichloride was added. During the reaction phase, separation occurred and both phases were subjected to vacuum distillation at 40° C. and 10 mm. of mercury pressure. The residual product was a yellow oil which was dissolved in benzene and water washed. The benzene was then removed by vacuum distillation leaving a residue of 45 parts (45 grams) of material equivalent to a 100 percent yield. Analysis of the product showed it to contain 7.74 percent sulfur and 2.14 percent chlorine. It is, thus, a mixture of 4,4'-thiobis-6-($\alpha$-methylbenzyl)-o-cresol] and 4-chloro-6-($\alpha$-methylbenzyl)-o-cresol containing a minor amount of 4,4'-polythiobis[6-($\alpha$-methylbenzyl)-o-cresol]. Further, fractionation of the product under low pressure yields substantially pure 4,4'-thiobis[6-($\alpha$-methylbenzyl)-o-ocresol] as a crystalline solid.

EXAMPLES 3–7

By adjusting the reaction time and the relative amount of hexane solvent and by further altering the reaction procedure a product containing varying amounts of sulfur and chlorine may be obtained. In general, the less solvent employed the faster the reaction and for any given amount of solvent a longer reaction time leads to higher concentrations of the halogenated product in addition to higher concentrations of di- and trithiobis compounds. This is illustrated by Examples 3–7 in Table I in which the reactants were the same as employed in Example 2 above, the variations being in the amount of solvent and reaction time as indicated in the table.

Table I

REACTION OF 6-($\alpha$-METHYLBENZYL)-o-CRESOL AND SCl$_2$

Reagents:
    24 parts of 6-($\alpha$-methylbenzyl)-o-cresol
    21 parts SCl$_2$
    n-Hexane (solvent)

| | Total Solvent, Parts by Wgt. | Reaction Time, Hours | Yield, percent | Analyses [1] | |
|---|---|---|---|---|---|
| | | | | Percent S | Percent Cl |
| Example 3 | 1,980 | 5 | 100 | 7.47 | 2.14 |
| Example 4 | 1,980 | 23 | ² 54 | 10.7 | 4.10 |
| Example 5 | 660 | 18 | 63 | 12.1 | 4.61 |
| Example 6 | 330 | ³ 2 | 92 | 8.79 | 4.46 |
| Example 7 | 165 | ³ 1½ | 97.5 | 8.05 | 2.02 |

Theory S=7.08 percent, Cl=0 percent.
[1] Low yields due to different recovery system: phase separation.
[2] Reaction was rapid.

EXAMPLE 8

Following the general procedure of Example 1, 50.8 parts of 2-tert-butyl-6-($\alpha$-methylbenzyl)phenol in 240 parts of nitrobenzene is reacted with 14.8 parts of sulfur monochloride dissolved in 120 parts of nitrobenzene. This reaction produced a good yield of 4,4'-thiobis[2-tert-butyl-6-($\alpha$-methylbenzyl)phenol] compounds which are a mixture of the mono-, di- and trithio compounds.

EXAMPLE 9

The process of Example 8 is repeated using 66.0 parts of 2,6-bis-(α,α-dimethylbenzyl)phenol as the starting material to produce the thiobis compounds.

EXAMPLE 10

Using 200 parts of ethylene dichloride as a solvent, 61.2 parts of 2-(α-methylbenzyl)-6-(α,α-dimethylbenzyl)-phenol are reacted with sulfur dichloride. The sulfur dichloride is added as a solution in 100 parts of ethylene dichloride over a 3 hour period while the reaction mixture is maintained at reflux. This reaction produces 4,4'-thiobis[2 - (α-methylbenzyl)-6-(α,α-dimethylbenzyl)phenol].

EXAMPLE 11

4.4' - thiobis - [2-(1,1,3,3-tetramethylbutyl)-6-(α,p-dimethylbenzyl)phenol] compounds of this invention are readily prepared by the reaction at reflux of 64.8 parts of 2 - (1,1,3,3-tetramethylbutyl)-6-(α,p-dimethylbenzyl)-phenol with sulfur monochloride in the presence of 2.4 parts of magnesium powder as a catalyst. At the end of the reaction the solvent is stripped from the reaction mixture and the excess magnesium is removed by filtration.

EXAMPLE 12

Following the procedure of Example 11 using as a starting material 78.8 parts of 6-(α,α-dipropyl-p-nonyl benzyl) phenol, the sulfur halide and a magnesium catalyst in carbon tetrachloride as a solvent produces 4,4'-dithiobis-[6-(α,α-dipropyl-p-nonyl benzyl)-o-cresol].

EXAMPLE 13

To illustrate the preparation of the compounds of this invention by the alkylation of 4,4'-thiobisphenol, 43.6 parts of this material are added to a reaction vessel containing 100 parts of octane as a slurrying diluent. Five parts of sulfuric acid are then added to the reaction vessel followed by the addition of 42 parts of styrene. The reaction mass is heated with agitation for 3 hours after which time it is washed with water to remove the sulfuric acid and stripped of volatiles at reduced pressure to yield 4,4'-thiobis[2,6-di-(α-methylbenzyl)phenol].

EXAMPLE 14

4,4'-thiobis o-cresol (48.8 parts) are reacted with 1.4 parts of aluminum to form a small amount of the aluminum phenolate. A small amount of n-decane is used as a solvent in this reaction. The resulting mixture is then further reacted with α-methyl styrene at 125° C. for 8 hours. Hydrolysis of the reaction product with water and removal of the water layer followed by stripping of hexane solvent produces a high yield of 4,4'-thiobis[6-(α,α-dimethylbenzyl)-o-cresol].

The compounds of this invention are outstanding antioxidants. Therefore, an embodiment of this invention is a new composition of matter which comprises organic material normally tending to undergo oxidative deterioration in the presence of air, oxygen or ozone, containing a small antioxidant quantity, up to about 5 percent, of a compound of this invention as described above. A preferred embodiment of this invention consists of organic material containing those compounds in which R in Formula I above is an alkyl group having from 1–4 carbon atoms. In this class of compound, the particularly preferred compounds are those in which R is a methyl or tertiary butyl group. These compounds are particularly preferred since they tend to exhibit the most desirable properties and are readily prepared.

The compounds of this invention find important utility as antioxidants in a wide variety of oxygen sensitive materials. Thus, liquid hydrocarbon fuels such as gasoline, kerosene and fuel oil are found to possess increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils; waxes, soaps and greases; plastics; synthetic polymers such as polyethylene and polypropylene; organometallic compositions such as tetraethyllead and tetraethyllead antiknock fluids; elastomers, including natural rubber; crankcase lubricating oils; lubricating greases; and the like, greatly increase their resistance to deterioration in the presence of air, oxygen or ozone.

The compounds of this invention are also very useful in protecting petroleum wax—paraffin wax and microcrystalline wax—against oxidative deterioration. They also find use in the stabilization of edible fats and oils of animal or vegetable origin which tend to become rancid especially during long periods of storage because of oxidative deterioration. Typical representatives of these edible fats and oils are linseed oil, cod liver oil, castor oil, soybean oil, rapeseed oil, coconut oil, olive oil, palm oil, corn oil sesame oil, peanut oil, babassu oil, butter fat, lard, been tallow, and the like.

The compounds of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like. Thus a preferred embodiment of the present invention is a rubber containing as an antioxidant therefor a 4,4' - thiobis[2,6-di - substituted phenol] as defined above. Another part of this invention is the method of preserving rubber which comprises incorporating therein a compound of this invention as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.01 to about 5.0 percent, based on the rubber.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and copolymers exemplified by the butadiene-styrene (GR–S and butadiene-acrylonitrile (GR–N or Paracril) rubbers and the like, although the invention is applicable to the stabilization of any rubber, high molecular weight organic material which is normally susceptible to deterioration in the presence of oxygen, air, or ozone. The nature of these rubbers is well known to those skilled in the art.

Among the definite advantages provided by this invention is that the present rubber compositions possess unusually great resistance against oxidative deterioration. Moreover, these compositions exhibit excellent non-staining and non-discoloration characteristics. Furthermore, the novel stabilizer is relatively inexpensive and easily prepared, and possesses the highly beneficial property of low volatility. As is well known, a highly desirable feature of a rubber antioxidant is that it have a low volatility so that it remains admixed with the rubber during vulcanization and related process steps.

The rubber compositions of the present invention are illustrated by the following specific examples wherein all parts and percentages are by weight.

EXAMPLE 15

To illustrate the enhanced oxygen resistance of the rubber compositions of this invention and their excellent non-staining and non-discoloration characteristics, a light-colored stock is selected for test. This stock had the following composition:

| | Parts by weight |
|---|---|
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |
| | 181.12 |

To the above base formula is added one part by weight of 4,4'-thiobis[2,6-di-(α-methylbenzyl)phenol] and individual samples are cured for 20, 30, 45 and 60 minutes at 274° C. using perfectly clean molds with no mold lubricant. Another set of samples of the same base formula which do not contain an antioxidant are cured under the same conditions.

To demonstrate the protection afforded to the rubber by the practice of this invention, the tensile strength and the ultimate elongation of stocks prepared by the addition of the inhibitor are determined before and after aging. These properties are also determined on the inhibitor-free stocks. The aging is accomplished by conducting the procedure of ASTM Designation: D–572–52, described in the ASTM Standards for 1952, Part 6, for a period of 168 hours at a temperature of 70° C. with an initial oxygen pressure in the test bomb of 300 p.s.i.g.

The tensile strength and the ultimate elongation of the test specimens before and after aging are measured by ASTM Test Procedure, D–412–51T (ASTM Standards for 1952, Part 6). The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substance.

Measurements are also made of the increase in weight of the test specimens which occur during the accelerated aging. This is a direct measure of the oxygen up-take of the samples and provides another criterion of the effectiveness of an inhibitor in suppressing oxidative deterioration of the rubber. Thus, the larger the weight increase, the greater is the deterioration and the less effective is the inhibitor.

In all the above tests, the composition compounded with 4,4'-thiobis-[2,6-di-(α-methylbenzyl)phenol] gives results which show this additive to be an excellent antioxidant.

EXAMPLE 16

To a synthetic rubber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is incorporated 1.5 parts of 4,4'-trithiobis-[6-(α,α-dimethylbenzyl)-o-cresol]. This batch is then cured for 60 minutes at 45 p.s.i. of steam pressure.

EXAMPLE 17

Natural rubber stock is compounded according to the following formula:

| | Parts |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| 4,4'-dithiobis [2,6-bis(α,α-dimethylbenzyl)phenol] | 1 |
| Benzothiazyl disulfide | 0.4 |
| Amine activator | 0.5 |

This stock is then vulcanized for 60 minutes at 280° F.

EXAMPLE 18

A butadiene-acrylonitrile copolymer is produced from butadiene-1,3 and 32 percent of acrylonitrile. Two percent (based on the dry weight of the copolymer) of 4,4'-thiobis[6-(α-methylbenzyl)-o-cresol] is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

EXAMPLE 19

Three percent of 4,4'-trithiobis[2,6-bis-(α-methylbenzyl)phenol] emulsified in sodium oleate is added to a rubber-like copolymer of butadiene-1,3 and styrene containing 25 percent of combined styrene.

EXAMPLE 20

A rubber stock is compounded from 100 parts of smoked sheet rubber, 60 parts of zinc oxide, 20 parts of lithopone, 2 parts of sulfur, 0.7 part of diphenyl guanidine phthalate, 0.8 part of benzoyl thiobenzothiazole, 0.2 part of paraffin and 2 parts of 4,4'-dithiobis-[2-(α,α-dimethylbenzyl)-6-tert-butylphenol]. The stock so compounded is cured by heating for 45 minutes at 126° C. in a press.

EXAMPLE 21

Two parts of 4,4'-trithiobis-[2-(α-ethyl-4-methylbenzyl)-6-ethylphenol] are incorporated in 100 parts of raw butyl rubber prepared by the copolymerization of 90 percent of isobutylene and 10 percent of isoprene.

EXAMPLE 22

To 200 parts of raw butyl rubber prepared by copolymerization of 95 percent of isobutylene and 5 percent of butadiene is added 1.5 parts of 4,4'-thiobis-[2-(α-propylbenzyl)-6-tert-amylphenol].

EXAMPLE 23

To master batch of GR–N synthetic rubber comprising 100 parts of GR–N rubber, 5 percent of zinc stearate, 50 parts of carbon black, 5 parts of road tar, 2 parts of sulfur and 2 parts of mercaptobenzothiazole is added 5 percent based on the weight of the batch of 4,4'-trithiobis-[6-(α,α-dimethylbenzyl)-o-cresol].

EXAMPLE 24

To natural rubber (Hevea) is added 0.1 percent of 4,4'-dithiobis-[2,6-(α-methylbenzyl)phenol].

Each of the above illustrated rubber compositions of this invention possesses greatly improved resistance against oxidative deterioration as compared with the corresponding rubber compositions which are devoid of an antioxidant. Moreover, the light-colored stocks of the above examples exhibit virtually no discoloration or staining characteristics even when subjected to severe weathering conditions and the like. The methods of formulating the improved rubber compositions of this invention will now be clearly apparent to those skilled in the art.

The amount of stabilizer employed in the rubber compositions of this invention varies from about 0.01 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional heat, stress and the like, the use of relatively high concentrations of this inhibitor is advantageous. On the other hand, when the article of manufacture is not to be subjected to such severe conditions, relatively low concentrations can be successfully utilized. Generally speaking amounts ranging from about 0.1 to about 3 percent by weight give uniformly satisfactory results.

Other rubbers and elastomers which can be preserved according to this invention are the rubbery polymerizates of isoprene, butadiene-1,3, piperylene; also the rubbery copolymer of conjugated dienes with one or more polymerizable monoolefinic compounds which have the capability of forming rubbery copolymers with butadiene-1,3, outstanding examples of such monoolefinic compounds being those having the group $CH_2=C<$, exemplified by styrene. Examples of such monoolefins are styrene, vinyl naphthalene, alpha methyl styrene, p-chlorostyrene, dichlorostyrene, acrylic acid, methyl acrylate, methyl methacrylate, methacrylonitrile, methacrylamide, methyl vinyl ether, methyl vinyl ketone, vinylidene chloride, vinyl carbazole, vinyl pyridines, alkyl-substituted vinyl pyridines, etc. In fact, excellent stabilization is achieved by incorporating a compound of this invention in any of the well known elastomers which are normally susceptible to deterioration in the presence of air, such as elastoprenes, elastolenes, elastothiomers, and elastoplastics.

As pointed out above, the compounds of this invention are effective antioxidants when added to other organic compositions, including saturated hydrocarbon synthetic polymers, normally tending to undergo deterioration in the presence of air, oxygen or ozone.

The saturated hydrocarbon synthetic polymer which has greatly enhanced oxidative stability by the practice of this invention, includes polymers obtained from the polymerization of a hydrocarbon monoolefin having up to 5 carbon atoms. Examples of such monomers include ethylene, propylene, butylene and isobutylene, and the various pentenes. Thus, the polymers are homopolymers and copolymers of ethylene, propylene, butylene and isobutylene.

A preferred embodiment of this invention is polyethylene containing a small antioxidant quantity, up to about 5 percent, of a compound of this invention as defined above. A particularly preferred embodiment of this invention comprises polyethylene containing from about 0.01 to about 2 percent of such a compound.

Polyethylene is a hydrocarbon polymer derived from the polymerization of ethylene. This polymerization can be accomplished by a great variety of methods which lead to products of diverse properties. Polyethylene of any nature may advantageously be utilized for preparing compositions according to the present invention. The polymers of ethylene which are employed may, for example, be similar to those which may be obtained by polymerizing ethylene in a basic aqueous medium and in the presence of polymerization-favoring quantities of oxygen under relatively high pressures in excess of 500 or 1,000 atmospheres at temperatures between 150 and 275° C. Or, if desired, they may be similar to the essentially linear and unbranched polymers ordinarily having greater molecular weights which may be obtained under relatively low pressures of 1 to 100 atmospheres using such catalysts to polymerize the ethylene as mixtures of strong reducing agents and compounds of group IVB, VB and VIB metals of the periodic system; chromium oxide on silicated alumina; hexavalent molybdenum compounds; and charcoal supported nickel-cobalt. The polyethylene which results from these various polymerization processes may have a molecular weight in the range from 1300 to over 1,000,000 depending on the particular conditions of polymerization employed.

The benefits derived from the practice of this invention are demonstrated by comparative oxidation tests of uninhibited polyethylene and polyethylene containing an antioxidant of this invention. These tests are conducted as follows: The selected amount of antioxidant is blended with the polyethylene by milling a weighed quantity of plastic pellets on a warm roll-mill. The weighed quantity of antioxidant is added to the mill after the polyethylene has been pre-milled for a short period of time. The plastic containing the antioxidant is then added in weighed quantity to a standard size vessel and melted to give a surface of reproducible size. The vessel is then inserted into a chamber which may be sealed and which is connected to a capillary tube leading to a gas buret and leveling bulb. The apparatus is flushed with oxygen at room temperature, sealed, and the temperature is raised to 150° C. The oxygen pressure is maintained at 1 atmosphere by means of the leveling bulb. The oxygen uptake at the elevated temperature is recorded for the duration of the test. This procedure has been adopted since it has been found that many compounds may inhibit the oxidation for a certain induction period after which time a very sharp increase in the rate of oxygen uptake occurs indicating that the antioxidant has been exhausted. In tests of this nature, it is found that the compositions of this invention inhibit the absorption of oxygen by the polyethylene to a great extent.

There are several methods available for preparing the inhibited hydrocarbon polymer compositions of this invention. Thus the blending of the 4,4'-thiobis(substituted phenol) compounds of this invention, with a polymer such as, for example, polyethylene, may be carried out on open rolls, on internal mixers or may be accomplished by mixing with extrusion. It is also possible to prepare concentrated batches of the polymer containing excessive amounts of the 4,4'-thiobis (substituted phenol) compounds of this invention and then mix the concentrate with additional polymer to prepare a composition of this invention. The preferred method of compounding the polymers is by milling on heated open rolls at slightly elevated temperatures by methods well-known to the art. The temperature range employed is sometimes critical as certain polyethylenes will not melt at low temperatures and tend to stick to the rolls at high temperatures. The 4,4'-thiobis (substituted phenol) compounds of this invention may be initially mixed with the polymer in the dried state or may be first dissolved in a suitable solvent, then sprayed on the polymer and milled in.

Examples of the hydrocarbon polymer compositions of this invention prepared as described above, follow. All parts and percentages are by weight in these examples.

EXAMPLE 25

To 1,000 parts of polyethylene produced by oxygen catalyzed reaction under a pressure of 20,000 atmospheres and having an average molecular weight of 40,000, is added and mixed 2 parts of 4,4'-thiobis[2-methyl-6-(α-methylbenzyl)phenyl]. The resulting composition has a greatly increased oxidative stability.

EXAMPLE 26

To 100 parts of polyisobutylene having an average molecular weight of 100,000 is added 0.5 part of 4,4'-thiobis-[2,6-di-(α,α-dimethylbenzyl)phenol]. The oxidative stability of the polymer is greatly increased by the addition of this compound.

EXAMPLE 27

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 4,4'-trithiobis-[2-isopropyl-6-(α-ethylbenzyl)phenol]. Polyethylene of improved oxidative stability results.

EXAMPLE 28

A linear polyethylene having a high degree of crystallinity (up to 93 percent) and below 1 ethyl branched chain per 100 carbon atoms, a density of about 0.96 gram per milliliter and which has about 1.5 double bonds per 100 carbon atoms is treated with $50 \times 10^{-6}$ roentgens of β-radiation. To the thus irradiated polymer is added 0.005 percent of 4,4'-thiobis-[2-methyl-6-(α-methylbenzyl)phenol], and the resulting product has improved stability characteristics.

EXAMPLE 29

To a polyethylene having an average molecular weight of 1500, a melting point of 88–90° C. and a specific gravity of 0.92 is added 1 percent of 4,4'-dithiobis-[2,6-di-(α-propylbenzyl)phenol]. After milling in the antioxidant an extremely oxidation resistant product results.

EXAMPLE 30

Two parts of 4,4'-trithiobis-[2,6-di-(α,α-diethylbenzyl)phenol] are added with milling to 100 parts of a low density polyethylene prepared by high pressure polymerization and which has an average molecular weight of about 20,000. The resulting product is vastly improved in its oxidative stability.

EXAMPLE 31

To 10,000 parts of a polyethylene having an average molecular weight of about 100,000 and which has a tensile strength of 5400 p.s.i., a Shore D hardness of 70 and a softening temperature of 130° C. under low load is added 10 parts of 4,4'-dithiobis-[2-methyl-6-(α-methylbenzyl)phenol], to prepare a composition of outstanding oxidative stability.

In addition to the 4,4'-thiobis (substituted phenol), the saturated hydrocarbon polymers of this invention may contain other compounding and coloring additives including minor proportions of carbon black, elastomers, polyvinyl compounds, carboxylic acid esters urea-aldehyde condensation products, flame retarding agents such as antimony trioxide and chlorinated hydrocarbons and various pigment compositions designed to impart color to the finished product.

Liquid hydrocarbon fuels employed in the operation of spark ignition combustion engines are also vastly improved in their storage stability by the practice of this invention. Table II, below, gives the compositions of a number of typical commercial gasolines which may be stabilized against oxidative deterioration by the inclusion therein of a compound of this invention.

*Table II*

GASOLINE COMPOSITIONS

| Gasoline | Percent Aromatics | Percent Olefins | Percent Saturates | Gravity, °API |
|---|---|---|---|---|
| A | 36.6 | 10.8 | 52.6 | 52.1 |
| B | 5.6 | 0.9 | 93.5 | 58.6 |
| C | 20.0 | 1.2 | 78.8 | 52.9 |
| D | 40.5 | 52.9 | 6.6 | 35.5 |
| E | 8.1 | 7.3 | 84.6 | 59.3 |

EXAMPLE 32

To 1,000 parts of gasoline A, as described in Table I, is added 10 parts of 4,4'-thiobis-[6-(α,α-dimethylbenzyl)-o-cresol].

EXAMPLE 33

To 10,000 parts of gasoline B is added 500 parts of 4,4'-trithiobis-[6-(α-methylbenzyl)-o-cresol].

EXAMPLE 34

To 10,000 parts of gasoline C is added 1 part of 4,4'-dithiobis[2,6-bis-(α,α-dimethylbenzyl)phenol].

Most gasolines in commercial use also contain an organometallic antiknock agent and certain scavengers therefor. The antiknock agent most frequently employed is tetraethyllead. The scavengers are ordinarily halohydrocarbon compounds of chlorine and bromine. Most widely used of these are ethylene dibromide and ethylene dichloride. In addition, gasolines often contain other additives such as dyes and phosphorus containing corrective agents. These gasoline compositions containing additives are also protected against oxidative deterioration by the practice of this invention as demonstrated by the following examples.

EXAMPLE 35

To 10,000 parts of gasoline D, which contains 2.39 g./gal. of tetraethyllead and 1 theory of bromine as ethylene dibromide, is added 100 parts of 4,4'-thiobis-[2,6-di-(α,α-diisopropylbenzyl)phenol].

EXAMPLE 36

To 1,000 parts of gasoline E, which contains 2.47 g./gal. of lead as tetraethyllead, 1 theory of chlorine as ethylene dichloride, 0.5 theory of bromine as ethylene dibromide and 0.2 theory of phosphorus as tris-(β-chloroisopropyl)thionophosphate, is added 5 parts of 4,4'-dithiobis-[6-(α-ethyl-α-propyl-p-nonylbenzyl)-o-cresol].

The tetraethyllead antiknock additive is supplied to oil companies as a mixture already containing the necessary dyes and scavengers. These mixtures, which are commonly known as antiknock fluid compositions, are also protected against oxidative deterioration by the practice of this invention.

EXAMPLE 37

To an antiknock fluid composition which is to be used as an additive to gasoline and which contains 61.5 parts of tetraethyllead, 17.9 parts of ethylene dibromide and 18.8 parts of ethylene dichloride is added with agitation 1.3 parts of 4,4'-thiobis-[2,6-bis-(α-methylbenzyl)phenol]. The resulting composition is stable for long periods when exposed to air.

EXAMPLE 38

To 1,000 parts of commercially available diesel fuel having an octane number of 51.7 and a 50 percent evaporation temperature of 509° F. is added 3 parts of 4,4'-dithiobis-[6-(α-methylbenzyl)-o-cresol]. The resulting fuel is stable to oxidative deterioration.

The compounds of this invention are also useful in preventing oxidative deterioration in lubricating oil compositions. Thus, an embodiment of this invention is a lubricating oil normally susceptible to oxidative deterioration containing a small antioxidant quantity, up to 5 percent, of a compound of this invention as defined above.

To prepare the lubricants of this invention, an appropriate quantity—from about 0.001 to about 5 percent and preferably from about 0.25 to about 2 percent—of the compound of this invention is blended with the base oil to be protected. Suitable base oils include mineral oils and also synthetic diester oils, such as sebacates, adipates, etc. which find particular use as aircraft instrument oils, hydraulic and damping fluids and precision bearing lubricants. All of these base oils are normally susceptible to oxidative deterioration, especially at elevated temperatures.

The finished lubricants of this invention have much greater oxidation stability and many other improved performance characteristics as compared with the corresponding base oils.

The following examples illustrate the preferred lubricating oil compositions of this invention.

EXAMPLE 39

To 1,000 parts of a solvent refined neutral oil (95 VI and 200 SUS at 100° F.) containing 6 percent of a commercial methacrylate Type VI approver which gives the finished formulation of a VI of 140 and a viscosity of 300 SUS at 100° F. is added 5 percent of 4,4'-thiobis-[6-($\alpha,\alpha$-dimethylbenzyl)-o-cresol].

EXAMPLE 40

To an additive-free solvent refined crankcase lubricating oil having a viscosity index of 95 and an SAE viscosity of 10 is added 0.001 percent of 4,4'-dithiobis [2,6-di-($\alpha,\alpha$-dimethylbenzyl)phenol].

EXAMPLE 41

To 100,000 parts of a petroleum hydrocarbon oil having a gravity of 30.0° API at 60° F., a viscosity of 178.8 SUS at 100° F., a viscosity index of 154.2 and which contains 0.2 percent sulfur, is added 200 parts of 4,4'-thiobis-[2-($\alpha,\alpha$-diethyl-p-methylbenzyl)-6-tert-butylphenol]. The resulting oil possesses greatly enhanced resistance to oxidative deterioration.

EXAMPLE 42

To 100,000 parts of a commercially available pentaerythritol ester having a viscosity at 100° F. of 22.4 centistokes, and known in the trade as "Hercoflex 600" is added 400 parts (0.4 percent) of 4,4'-trithiobis-[2,6-bis-($\alpha$-methylbenzyl)-phenol]. The resulting finished oil possesses markedly improved resistance against oxidative deterioration.

EXAMPLE 43

To 100,000 parts of dioctyl sebacate having a viscosity of 210° F. of 36.7 SUS, a viscosity index of 159 and a molecular weight of 426.7 is added 250 parts (0.25 percent) of 4,4'-thiobis-[6-($\alpha$-methylbenzyl)-o-cresol].

To illustrate the benefits obtained by the practice of this invention, a standard oil oxidation test is used. The equipment and test procedure described by Kroger et al., Erdol and Kohle, 2, page 398 (1949), served as a basis for the tests. The equipment and procedures are slightly modified in order to make the oxidizing conditions more strenuous. In this manner the test lubricants are subjected to severe oxidizing conditions in order to conclusively establish the effectiveness of additives under very adverse conditions. Furthermore, the modifications are found to provide results which correlated extremely well with test results of other standard procedures, including actual engine tests.

The equipment consists of a reaction cell connected with an open end manometer whereby the total upstake of oxygen by the oil is determined by noting the drop in height of the mercury in the manometer. The test oil sample is placed in the reaction cell which is then flushed with oxygen and the temperature is then raised and held at that selected for the test until the substrate oil undergoes catastrophic oxidation which is shown by a rapid oxygen. In all cases, the test oil is deliberately contaminated with iron hexoate as an oxidation promoter. In tests of this nature, the oxidation stability of a test lubricant is determined by measuring its induction period, that is, the time required for catastrophic deterioration under the above outlined conditions. The longer the induction period, the more stable the lubricant. In tests of this nature lubricants containing an additive of this invention give excellent results.

EXAMPLE 44

To show the useful properties of the novel compounds of this invention, recourse is had to the Polyveriform oxidation stability test as described in the paper entitled "Factors Causing Lubricating Oil Deterioration in Engines" (Ind. and Eng. Chem., Anal. Ed. 17, 302 (1945)). See also "A Bearing Corrosion Test for Lubricating Oils and Its Correlation With Engine Performance" (Anal. Chem., 21, 737 (1949)). This test effectively evaluates the performance of lubricating oil antioxidants. The test equipment procedure employed and correlations of the results with engine performance are discussed in the first paper above cited. By employing various compounds of this invention in oxygen-sensitive lubricating oil, effective inhibition of oxidative deterioration is achieved.

Comparative tests were conducted using the method and apparatus essentially as described in the publication first above mentioned. One minor modification was that the steel sleeve and copper test piece described in this publication were omitted from the apparatus. In these tests an initially additive-free, 95 V.I. solvent-refined SAE-10 crankcase oil was used. The principal test conditions consisted of passing 70 liters of air per hour through the test oil for a total period of 20 hours while maintaining the oil at a temperature of 300° F. Oxidative deterioration of the oil was further promoted by employing as oxidation catalysts 0.05 percent by weight of ferric oxide (as ferric 2-ethyl hexoate) and 0.10 percent by weight of lead bromide, both of these amounts being based upon the weight of oil employed.

A lubricating oil of this invention was prepared by blending one percent by weight of the product of Example 2, 4,4'-thiobis-[6-($\alpha$-methylbenzyl)-o-cresol] with the oil described above. This composition was compared in the Polyveriform test with a sample of the oil not containing the antioxidant. Whereas during the test the oil containing no antioxidant increases in acid number to a final acid number of about 5.6 and showed a tremendous increase in viscosity, to the extent that the viscosity increases 189 percent; the sample containing the antioxidant of this invention had a final acid number of only 3.9 and had increased in viscosity only 69 percent during the test, thus showing an unusual improvement over the base oil.

The compounds of this invention are also useful as additives to functional fluids and automatic transmission fluids. The primary constituent of a functional fluid is a refined mineral lubricating oil having carefully selected minimum viscosity of 49 Saybolt Universal seconds (SUS) at 210° F. and a maximum viscosity of 7,000 SUS at 0° F., generally a distillate oil, lighter than an SAE 10 motor oil. The oil usually amounts to between about 73.5 to about 97.5 percent by weight of the finished fluid. Preferably, the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl and mercaptan. The metal atoms may be aluminum, calcium, lithium, barium, strontium, and magnesium. The organic components contain oil solubilizing groups such as high molecular weight straight or branched chain paraffins, aromatic or naphthenic rings, or contain a halogen. These metal compounds are present in the compounded fluid in a concentration range of between about 0.1 to about 5 percent by weight. These compounds include alkaline-earth metal salts of phenyl-substituted long chain fatty acids, alkaline-earth metal salts of the capryl or octyl esters of salicylic acid, the alkaline-earth metal salts of petroleum sulfonic acids, the alkaline-earth metal salts of alkyl-substituted phenol sulfides, the salt of aluminum or the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to two or three times as much metal as the normal phenate.

In addition, functional fluids may contain additional components which improve the properties of the fluid. Typical components and their concentration range in the fluid are as follows:

From about 1 to about 5 percent of an anti-squawk additive, usually a sulfurized oil, such as sulfurized sperm oil, sulfurized lard, sulfurized vegetable oil, sulfurized glyceride, or a sulfurized ester of fatty acids.

From about 0.05 to about 2 percent of a pour point depressant. Typical types of additives are wax-substituted naphthalenes, esters of wax-substituted phenol, polymerized unsaturated esters and acrylic polymers such as polymerized esters of methacrylic acid.

About 0.005 to about 0.1 percent of a foam inhibitor. Foam inhibitors include fatty acids and fatty acid esters, pine oil, alkyl lactates, higher ethers such as 2-(di-tert-amyl phenoxy) ethanol and mixtures of materials such as glycerol and sodium bis(2-ethylhexyl)sulfosuccinate.

From about 0.3 to about 0.1 percent of a rust preventive such as carboxylic acid derivatives including alkylated succinic acid, esters and partial esters of di- and polycarboxylic acids, esters and partial esters of hydroxy-substituted di- and polycarboxylic acids and alkyl-substituted acids containing at least two carboxylic acid groups joined by nitrogen, oxygen or sulfur esters of acids derived from oxidized petroleum; amine derivatives including hydroxy amines, hydroxy amidines, amine salts of partial esters of phosphorus acids, hydroxy amine salts of oxidized petroleum acids, hydroxy amine salts of fatty acids and long chain alkyl amines; organic sulfonates; long chain alkyl ketones; organic phosphates and phosphites; morpholine derivatives and phosphatides including lecithin and fatty acids.

About 0.1 to about 2 percent of an extreme pressure agent. These include organic compounds containing chlorine, phosphorus and sulfur, such as chlorinated waxes of a $P_2S_5$-terpene reaction product; organic phosphates and phosphites such as for example, tricresylphosphate or a zinc dialkyl dithiophosphate and lead soaps such as lead naphthenate.

From about 0.05 to about 0.2 percent of a metal deactivator. Such compounds include complex organic nitrogen and sulfur-containing compounds, as for example, amines and sulfides. Also included are such compounds as organic dihydroxyphosphines, trialkyl and triaryl phosphites, certain diamines and soaps containing a metal such as tin, nickel, chromium, thallium or titanium.

From about 1 to about 10 percent of a viscosity index improver such as a polymerized olefin or isoolefin, butylene polymer or alkylated styrene polymer.

The following examples show typical functional fluids of this invention. The fluids are formed by mixing the ingredients together, while heating the oil to a temperature up to 200° F.

EXAMPLE 45

A fluid of this invention is prepared by blending 80 parts of a conventionally-refined Pennsylvania mineral oil (99 SUS at 100° F.), 2 parts of 4,4'-thiobis-[2,6-di-(α-methylbenzyl)phenol], 5 parts of barium petroleum sulfonate, 10 parts of a polyacrylate having a molecular weight of approximately 7,000 derived from a fatty alcohol such as cetyl or lauryl alcohol, 0.1 part of a dimethyl silicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity of 60/60° F. of 0.919.

EXAMPLE 46

Another such fluid consists of 95 parts of a solvent-refined, light acid-treated, clay-contacted, solvent dewaxed paraffin base distillate mineral oil (110 SUS at 100° F.); 0.1 part of 4,4'-dithiobis-[2-(α-methylbenzyl)-o-cresol]; 0.1 part of calcium octyl phenol sulfide; 2 parts of a sulfurized sperm oil having a sulfur content between 10–12 percent, a viscosity of 210° F. of 200 SUS and a pour point of 65° F.; 0.3 part of an ester of an aromatic acid and wax-alkylated phenol having a molecular weight of approximately 450; 2.5 parts of a linear pale color isobutylene polymer of a controlled molecular weight having a viscosity of 3,000 SUS at 210° F., a specific gravity 60/60 F. of 0.875.

EXAMPLE 47

An automatic transmission fluid is made by mixing 97 percent of an oil blend comprising 59.0 parts of a solvent extracted, Coastal oil, 40 SUS at 210° F.; 1.0 part of 4,4'-thiobis-[2,6-di-(α,α-dimethylbenzyl)phenol]; 1.0 part of a barium phenol sulfide containing 2.4 percent barium, 2 percent calcium and 3.5 percent sulfur, having a viscosity of 126 SUS at 210° F., a flash point of 430° F., a pour point of 10° F. and a specific gravity 60/60° F. of 0.97; 1.0 part of sulfurized sperm oil.

EXAMPLE 48

96 parts of a conventionally-refined Pennsylvania mineral oil (99 SUS at 100° F.); 2 parts of 4,4'-trithiobis-[2-tert-butyl-6-(α-methylbenzyl)phenol]; 2 parts of a mixed barium phenol sulfide-calcium sulfonate containing 5.7 percent barium, 0.68 percent calcium and 2.9 percent sulfur, having a viscosity of 92 SUS at 210° F., a flash point of 410° F., a pour point of 10° F. and a specific gravity 60/60° F. of 0.988 are blended into an effective fluid of this invention.

We claim:

1. A compound having the formula

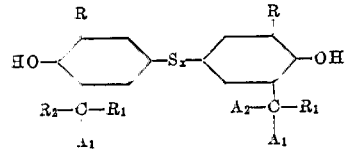

where R is an organic hydrocarbon radical having from 1 to about 22 carbon atoms, $R_1$ is an alkyl radical having from 1–3 carbon atoms, $R_2$ is selected from the group consisting of hydrogen and alkyl radicals having from 1–3 carbon atoms, $A_1$ is an aromatic hydrocarbon radical having from 6 to about 12 carbon atoms, and $x$ ranges from 1 to about 3.

2. A compound having the formula

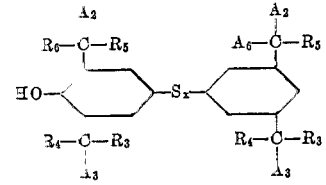

where $R_3$ and $R_5$ are alkyl radicals having from 1–3 carbon atoms; $R_4$ and $R_6$ are groups selected from the class consisting of hydrogen and the methyl group, $A_2$ and $A_3$ are aromatic hydrocarbon radicals having from 6 to about 12 carbon atoms and $x$ ranges from 1 to about 3.

3. Organic material normally tending to undergo oxidative deterioration in the presence of air, or oxygen, containing a small antioxidant quantity, up to 5 percent, of the compound of claim 1.

4. The composition of claim 3 wherein said organic material is a high molecular weight unsaturated polymer.

5. The composition of claim 4, wherein said high molecular weight unsaturated polymer is rubber.

6. 4,4'-thiobis-[6-(α-methylbenzyl)-o-cresol].

7. The compound of claim 1 wherein $x$ is 2.

8. The composition of claim 3 containing a small antioxidant quantity, up to 5 percent, of 4,4'-thiobis-[6-(α-methylbenzyl)-o-cresol].

9. Organic material normally tending to undergo oxidative deterioration in the presence of air or oxygen containing a small antioxidant quantity, up to 5 percent, of the compound of claim 7.

10. Organic material normally tending to undergo oxidative deterioration in the presence of air or oxygen containing a small antioxidant quantity, up to 5 percent, of the compound of claim 1 wherein $x$ is 3.

11. The composition of claim 3 wherein said organic material is a saturated hydrocarbon synthetic polymer.

12. The composition of claim 11 wherein said saturated hydrocarbon synthetic polymer is polyethylene.

13. The composition of claim 12 containing a small antioxidant quantity, up to 5 percent, of 4,4'-thiobis-[6-(α-methylbenzyl)-o-cresol].

14. The composition of claim 3 wherein said organic material is a liquid hydrocarbon fuel.

15. The composition of claim 14 wherein said liquid hydrocarbon fuel is gasoline.

16. The composition of claim 15 containing a small antioxidant quantity, up to 5 percent, of 4,4'-thiobis-[6-(α-methylbenzyl)-o-cresol].

17. The composition of claim 3 wherein said organic material is a lubricating oil.

18. The composition of claim 17 containing a small antioxidant quantity, up to 5 percent, of 4,4'-thiobis-[6-(α-methylbenzyl)-o-cresol].

19. The composition of claim 3 wherein said organic material is a functional fluid.

20. The composition of claim 19 containing a small antioxidant quantity, up to 5 percent, of 4,4'-thiobis-[6-(α-methylbenzyl)-o-cresol].

References Cited in the file of this patent
UNITED STATES PATENTS 2,849,517   Albert _____ Aug. 26, 1958